United States Patent
Ross et al.

(10) Patent No.: US 7,343,510 B1
(45) Date of Patent: Mar. 11, 2008

(54) METHOD AND DEVICE FOR SELECTING ONE OF MULTIPLE CLOCK SIGNALS BASED ON FREQUENCY DIFFERENCES OF SUCH CLOCK SIGNALS

(75) Inventors: Mark Ross, San Carlos, CA (US); S. Babar Raza, San Jose, CA (US); Dimitris Pantelakis, Austin, TX (US); Anup Nayak, Fremont, CA (US); Walter Bridgewater, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 462 days.

(21) Appl. No.: 11/019,731

(22) Filed: Dec. 21, 2004

Related U.S. Application Data (60) Provisional application No. 60/531,857, filed on Dec. 22, 2003.

(51) Int. Cl.
  *G06F 1/12* (2006.01)
(52) U.S. Cl. .............. 713/500; 713/400; 713/500; 713/502; 713/503; 327/1; 327/48; 331/11
(58) Field of Classification Search .......... 713/400; 327/48
  See application file for complete search history.

(56) References Cited

U.S. PATENT DOCUMENTS

| | | | |
|---|---|---|---|
| 3,708,686 A * | 1/1973 | Butler et al. .......... | 307/149 |
| 4,620,118 A | 10/1986 | Barber | |
| 5,072,497 A | 12/1991 | Burgess et al. | |
| 5,101,497 A | 3/1992 | Culley et al. | |
| 5,179,704 A | 1/1993 | Jibbe et al. | |
| 5,261,107 A | 11/1993 | Klim et al. | |
| 5,309,567 A | 5/1994 | Mizukami | |
| 5,317,747 A | 5/1994 | Mochida et al. | |
| 5,398,211 A | 3/1995 | Willenz et al. | |
| 5,511,100 A * | 4/1996 | Lundberg et al. .......... | 375/376 |
| 5,850,401 A * | 12/1998 | Murakami .......... | 370/395.62 |
| 6,018,785 A | 1/2000 | Wenniger | |
| 6,075,833 A * | 6/2000 | Leshay et al. .......... | 377/16 |
| 6,392,494 B2 * | 5/2002 | Takeyabu et al. .......... | 331/11 |
| 6,563,346 B2 * | 5/2003 | Abbiate et al. .......... | 327/48 |
| 6,625,711 B1 | 9/2003 | Raza et al. | |
| 6,646,473 B1 * | 11/2003 | Trivedi et al. .......... | 326/96 |

(Continued)

OTHER PUBLICATIONS

U.S. Appl. No. 11/019,702, Nayak et al.

(Continued)

*Primary Examiner*—Nitin C. Patel
(74) *Attorney, Agent, or Firm*—Haverstock & Owens, LLP (57) ABSTRACT

A clock detection and selection circuit (100) can include a first counter (102-0) that generates a first count value CNT1 according to a first clock signal CLK1 and a second counter (102-1) that generates a second count value CNT2 according to a second clock signal CLK2. First separation-detect logic (102-0) and second separation-detect logic (102-1) determine if a pre-specified difference exists between a first count value (CNT1/CNT1') and second count value (CNT2/CNT2'). According to such determinations, separation information (INF_1 and INF_2) can be generated indicating which clock signal (CLK1 or CLK2) is faster. Selection logic (106) can select a faster of the clock signals (CLK1 or CLK2) if the separation information values confirm one another.

19 Claims, 7 Drawing Sheets

U.S. PATENT DOCUMENTS

| | | |
|---|---|---|
| 6,674,306 B1 | 1/2004 | Reynolds |
| 6,715,021 B1 | 3/2004 | Paul et al. |
| 6,771,729 B1 * | 8/2004 | Takahashi et al. .......... 375/376 |
| 6,781,418 B1 | 8/2004 | Reynolds |
| 6,816,955 B1 | 11/2004 | Raza et al. |
| 6,816,979 B1 | 11/2004 | Chen et al. |
| 6,834,093 B1 * | 12/2004 | Chiu ........................... 377/39 |
| 6,853,218 B1 | 2/2005 | Reynolds |
| 2001/0045868 A1 * | 11/2001 | Takeyabu et al. .............. 331/2 |

OTHER PUBLICATIONS

U.S. Appl. No. 10/286,223, Sywyk, Stefan.

* cited by examiner

METHOD AND DEVICE FOR SELECTING ONE OF MULTIPLE CLOCK SIGNALS BASED ON FREQUENCY DIFFERENCES OF SUCH CLOCK SIGNALS

This application claims the benefit of U.S. provisional patent application Ser. No. 60/531,857, filed Dec. 22, 2003.

TECHNICAL FIELD

The present invention relates generally to memory devices and systems, and more particularly to a device and method for detecting and selecting the faster of multiple received clock signals.

BACKGROUND OF THE INVENTION

In some integrated circuit applications, a single device can receive multiple clock signals and select one clock signal for performing internal circuit functions. Such devices can include a clock selection circuit for selecting between multiple clock signals based on predetermined criteria. One such application can occur in dual ported memory devices or systems. In such applications, multiple clock signals can be received and the faster of the clock signals can be selected for the timing of an internal memory core.

In order to provide the flexibility of connecting any one of the ports to any of the clock domains without reconfiguring the memory device, a circuit or logic can be included on the memory device that can select the faster clock.

Figure 9:
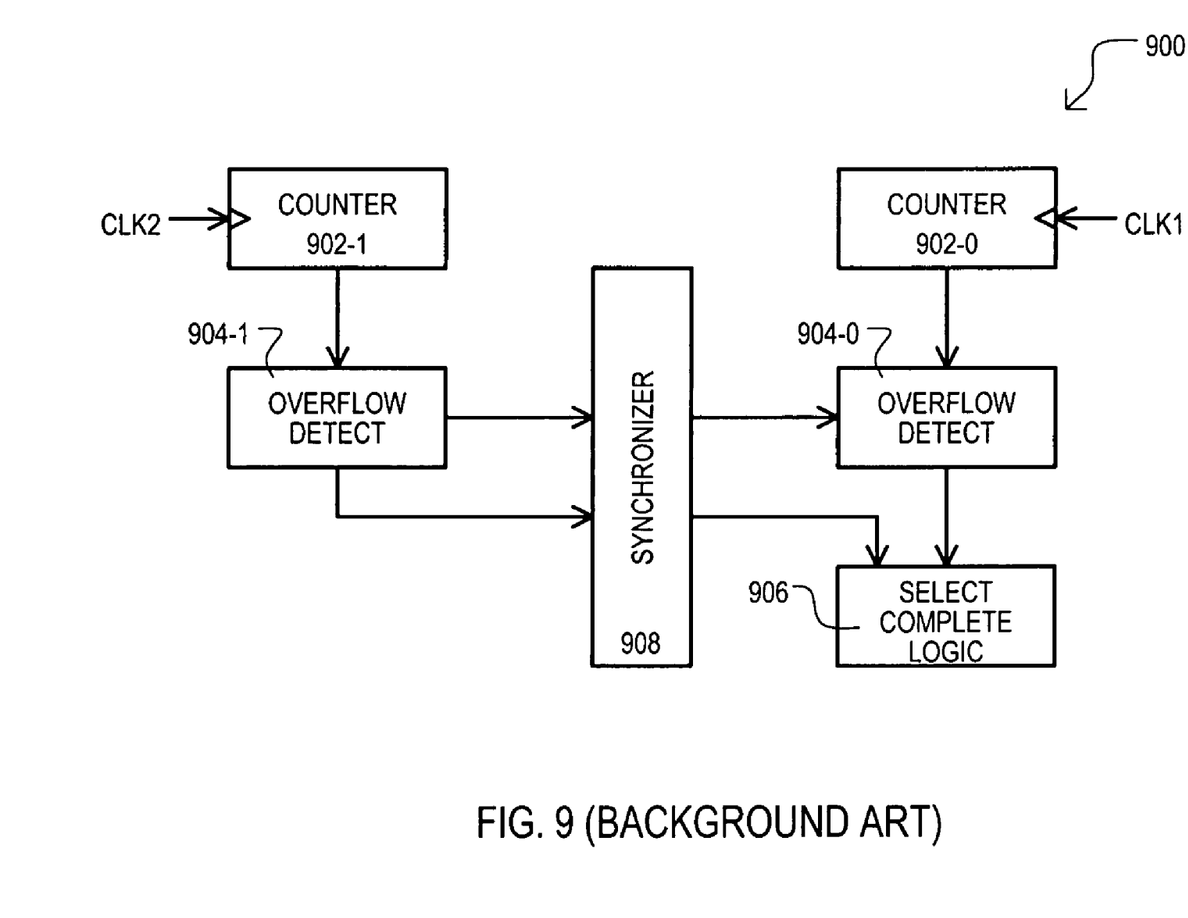
FIG. 9 is a block schematic diagram of a conventional clock selection detection circuit.

A conventional approach for detecting a faster of two clock signals is shown in FIG. 9, and designated by the general reference character 900. The conventional approach shows an "overflow" method. In the conventional overflow method shown, a clock detection/selection circuit 900 can include two counters 902-0 and 902-1, each operating in a different clock domain. Thus, counter 902-0 operates in a first clock domain (based on a first clock signal CLK1), while counter 902-1 operates in a second clock domain (based on a second clock signal CLK2). Counters (902-0 and 902-1) can be Gray Code counters.

Each counter (902-0 and 902-1) can generate a count value based on its respective clock signal (CLK1 and CLK2). Count values from counters 902-0 and 902-1, can be provided to overflow detectors 904-0 and 904-1, respectively. The faster of the two clock signals (CLK1 and CLK2) can be determined by detecting an overflow condition. An overflow condition can be detected by examining the most significant bit of each counter (902-0 and 902-1). Whichever counter reaches an overflow condition first, can be considered the faster clock.

A faster clock signal can be selected based on the overflow information by select logic 906. Such a faster clock can be utilized to time the operations of another circuit, such as a core portion of a dual-port random access memory (RAM).

Both counter 902-1 and overflow detector 904-1 can operate in one clock domain (e.g., based on clock CLK2), while the other components can operate in a different clock domain (e.g., based on clock CLK1). Thus, to ensure appropriate timing between signals generated in the different clock domains, output signals from overflow detector 904-1 can be provided to other circuit components by way of a synchronizer 908.

The bit size of the counters (902-0 and 902-1) can be selected according to expected deviation between clock signals, typically expressed in parts per million (ppm) from a center frequency.

While the above-described approach can select the faster of two clock signals, the above circuit can have disadvantages. In the event the two clocks differ in frequency by a very small amount, detection of the fastest clock can take a significant amount of time. For example if the device is designed to detect the faster clock of two clocks having a difference of 20 ppm, one clock cycle difference will occur after 50,000 cycles. Thus, a counter overflow method would require a 16-bit counter. Counting 64K clock cycles can present a significant amount of time before a fastest clock can be selected.

Still further, using the same conventional example above, the time required to determine a faster clock signal can get even more significant in a system where the difference between the two clocks from each other is smaller. For a 10 ppm difference, 100K clock cycles are required. Even in cases where the clock difference is larger, the overflow method requires waiting until an overflow of the fastest clock. So, even if one clock is twice as fast as the other clock, it will still require 64K cycles of the faster clock to arrive at a fastest clock determination.

In light of the above, it would be desirable to arrive at one way of detecting the faster of multiple clock signals that does not introduce the substantial counting delay noted above.

In addition, it would be desirable to arrive at a multiported memory device having logic or other circuitry for detecting the faster of multiple clock signals, and using a faster clock signal to run the internal core timing of the memory device.

SUMMARY OF THE INVENTION

The present invention can provide solutions to the above and other problems, and can offer further advantages over conventional circuits for detecting and selecting a faster of multiple received clock signals.

According to one aspect of the embodiments, an apparatus for detecting and selecting a faster clock signal from a plurality of clock signals can include at least two counters, each adapted to receive and count pulses of one of the clock signals, and a pair of separation-detectors coupled to one of the at least two counters and to one another. Each separation-detector can receive a multi-bit count value representing a clock pulse count for the corresponding counter, compare the received multi-bit count value to a multi-bit count value from another counter, and detect a pre-specified bit separation between said multi-bit count values. The apparatus can also include a selector that receives bit separation detections from the pair of separation-detectors adapted to select the faster of the clock signals.

In such an arrangement a faster of two clocks can be determined by examining a difference between the clocks, such a bit separation distance. This can result in faster detection for certain frequency difference, as a system does not have to wait for a counter to overflow in order to determine the faster clock.

According to one aspect of the embodiments, counters can be Gray code counters.

According to another aspect of the embodiments, a synchronizer can be included through which each of the separation-detectors are coupled to each other, and through which at least one separation-detector is coupled to the selector. The synchronizer can be adapted to synchronize the output from one of the counters to another of the counters.

In this way, count values generated in one clock domain can be operated on in another clock domain.

According to another aspect of the embodiments, each separation-detector can ignore a number of least significant bits of the multi-bit count values when comparing the received multi-bit count value to the multi-bit count value from the other counter.

Such an arrangement is useful in accounting for startup differences between the two clock domains.

According to another aspect of the embodiments, an apparatus can also include a pair of overflow-detectors coupled to the two counters and to one another. Each overflow-detector can receive the multi-bit count value representing a clock pulse count for the corresponding counter and generate an overflow indication when the received multi-bit count value overflows. In addition, a selector can be coupled to receive an overflow indication from each of the overflow-detectors.

In this arrangement, a faster clock can be detected based on both overflow indications and a pre-specified bit separation.

According to another aspect of the embodiments, each separation-detector can generate bit separation information upon detecting a pre-specified bit separation between a first count value and a second count value. Bit separation information can have one value when the first count value exceeds the second count value, and a complement of the one value when the second count value exceeds the first count value.

Such an arrangement can help ensure the faster clock signal is reliably selected.

According to another aspect of the embodiments, an apparatus for detecting and selecting a faster clock signal can be formed within a dual port memory device having an internal memory core that runs on timing based on the faster clock signal as selected by the selector.

In this way, a dual port memory device can rapidly and reliably select a faster clock signal for use as the internal memory core timing.

The present invention can also include a method for detecting and selecting a faster one of first and second clock signals having different frequencies. The method can include counting clock pulses of the first and second clock signals to generate a multi-bit first value representing a number of clock pulses of the first clock signal and a multi-bit second value representing a number of clock pulses of the second clock signal, detecting a bit-separation between the multi-bit first and second values and determining if the bit-separation is greater than a pre-specified bit-separation, and selecting the faster one of first and second clock signals. By detecting a bit separation between count values, rather than an overflow condition, faster detection can occur for certain frequency differences as a bit separation value can be reached faster than a counter overflow.

According to another aspect of the embodiments, counting clock pulses can include counting the first clock signal pulses according to a Gray code count, and counting the second clock signal pulses according to a Gray code count.

According to another aspect of the embodiments, detecting a bit-separation between the multi-bit first and second values can include comparing the multi-bit first and second values in a first separation-detector and determining if a bit separation between the two values is greater than a pre-specified bit separation. The step can also include comparing the multi-bit first and second values in a second separation-detector and determining if a bit separation between the two values is greater than the pre-specified bit separation.

In such an arrangement, bit separation can be rapidly determined with a logic gates. For example, exclusive-OR gates in conjunction with AND-OR gate combinations.

According to another aspect of the embodiments, selecting the faster one of first and second clock signals can include receiving first bit separation information from a first separation-detector that indicates one of the first or second clock signals is faster, receiving second bit separation information from the second separation-detector that indicates one of the first or second clock signals is faster, and selecting the faster clock signal when first bit separation information is verified by the second bit separation information.

Such an arrangement can provide for a more accurate determination of a faster clock signal by presenting "dual redundancy" by selecting a clock according to two separately generated information values.

The present invention can also include a semiconductor device that has a first counter that can generate a first count value based on pulses of a first clock signal, first detect logic that can compare the first count value to a second count value and generates a first selection information representing a frequency difference between the first clock signal and a second clock signal, and a synchronizer circuit that provides the second count value to the first logic circuit, the second count value being based on pulses of the second clock signal.

According to another aspect of the embodiments, first selection information can be a multi-bit value.

According to another aspect of the embodiments, a first count value can be a multi-bit value, a second count value has a bit corresponding to each bit of the first count value, and first detect logic can comprises a plurality of exclusive-OR (XOR) gates, each having one input coupled to receive a bit of the first count value and another input coupled to receive the corresponding bit of the second count value.

According to another aspect of the embodiments, a first counter operation can be based on a timing of the first clock signal. In addition, a second counter can generate a second count value based on pulses of the second clock, the second counter operation being based on a timing of the second clock signal.

In this way two counters can operate according to different clock signals (i.e., different clock domains).

According to another aspect of the embodiments, a semiconductor device can also include second detect logic that can compare the first count value to a second count value and generate a second selection information representing a frequency difference between the first clock signal and a second clock signal.

In this way, two count values are generated allowing redundancy in the determination of the faster clock signal.

According to another aspect of the embodiments, a semiconductor device can also include selection logic that selects the first clock signal or second clock signal as a timing signal for an internal section of the semiconductor device based at least the first selection information.

According to another aspect of the embodiments, selection logic can select the first clock signal or second clock signal as the timing signal based on at least the first and second selection information.

In this way, selection of a faster clock signal can be based on two sets of selection information, allowing one bit separation value to verify the other.

According to another aspect of the embodiments, a semiconductor device can further include at least a first overflow detector coupled to the first counter that can generate a first overflow indication when the first counter overflows. Selection logic can select the first clock signal or second clock signal as a timing signal for an internal section of the semiconductor device based at least the first selection information and the first overflow indication.

According to another aspect of the embodiments, a semiconductor device can include a second overflow detector coupled to the second counter that can generate a second overflow indication when the second counter overflows. In addition, selection logic can select the first clock signal or second clock signal based on at least the first and second selection information and the first and second overflow indications.

DETAILED DESCRIPTION

Various embodiments of the present invention will now be described in detail with reference to a number of drawings. The embodiments include devices and methods for detecting and selecting the faster of multiple clock signals. In particular embodiments, a selected clock signal can run an internal portion of a device.

Figure 1:
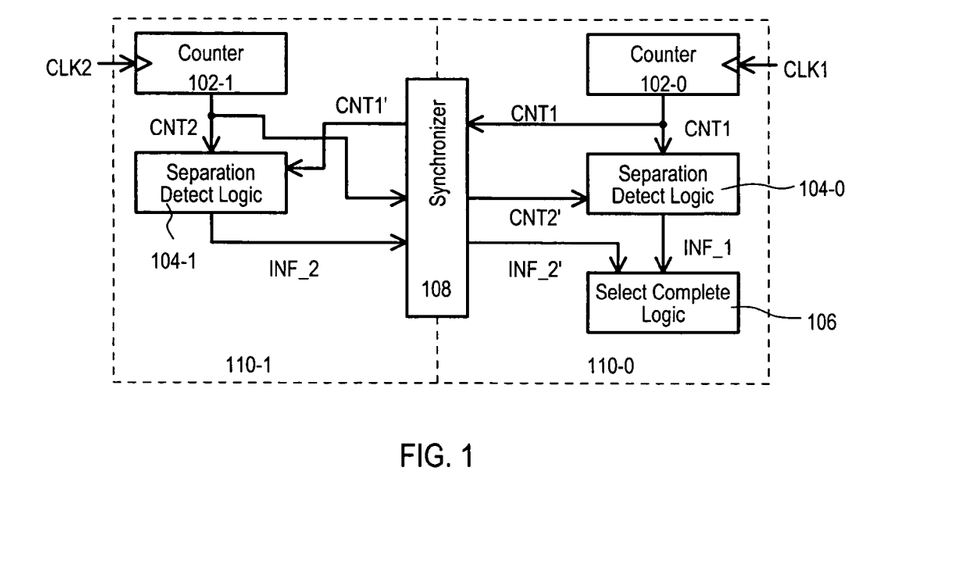
FIG. 1 is a block schematic diagram of a first embodiment of the present invention.

Referring now to FIG. 1, a device according to a first embodiment is set forth in a block schematic diagram and designated by the general reference character 100. The approach of FIG. 1 focuses on detecting a separation of two count values representing a number of clock pulses counted for each clock signal by two independent counters. In this approach, logic can be included that detects the separation between the two counter values.

A circuit 100 can include a first counter 102-0, a second counter 102-1, first separation-detect logic 104-0, and second separation-detect logic 104-1. A device 100 can also include selection logic 106 and a synchronizer circuit 108.

A first counter 102-0 can receive a first clock signal CLK1, and generate a first count value CNT1 based on predetermined transitions in the first clock signal CLK1. For example, a first counter 102-0 may increment first count value CNT1 each clock cycle of the first clock signal. A first counter 102-0 can be reset to an initial count value (e.g., 0) to begin a new counting sequence.

In the same general fashion, a second counter 102-1 can receive a second clock signal CLK2, and can generate a second count value CNT2. A second counter 102-1 can also be reset to an initial count value to begin a new counting sequence. Preferably, a second counter 102-1 can be reset at essentially the same time a first counter 102-0 is reset.

Preferably, first and second counters (102-0 and 102-1) can be Gray code counters. As is well understood in the art, a Gray code counter can generate a count sequence in which only one bit changes between successive increments or decrements.

The particular device of FIG. 1 can be conceptualized as splitting operations between two clock domains. Thus, first counter 102-0, first separation-detect logic 104-0 and selection logic 106 can operate according to timing based on a first clock signal CLK1, and thus are represented as being in a first clock domain 110-0. Similarly, second counter 102-1 and second separation-detect logic 104-1 can operate according to timing based on a second clock signal CLK2, and thus are represented as being in a second clock domain 110-1.

Synchronizer 108 can transmit data between clock domains by transmitting input data from one clock domain (e.g., 110-0 or 110-1) at timing appropriate for the other clock domain (e.g., 110-1 or 110-0). In FIG. 1, signals synchronized into a new clock domain are designated by the mark "'".

Differences between count values (CNT1 vs. CNT2' and/or CNT1' vs. CNT2) can then be measured to determine which of the clocks (CLK1 or CLK2) is faster. Optionally, such a measurement can be performed by separation-detect logic.

In the particular example of FIG. 1, a first separation-detect logic 104-0 can receive a first count value CNT1 and a second count value CNT2' as inputs. It is understood, a second count value CNT2' can be the count value CNT2 after being synchronized to clock domain 110-0 by synchronizer 108. First separation-detect logic 104-0 can determine if a pre-specified difference exists between the first and second count values (CNT1 and CNT2). As but one example, once first and second count values (CNT1 and CNT2) differ by a specified bit distance (e.g., 2 or 3 bits), first separation-detect logic 104-0 can generate first separation information INF_1, that indicates the pre-specified difference has been met. More particularly, separation information INF_1 can be latched and output.

While first separation-detect logic 104-0 can serve to determine when a pre-specified difference exists between first and second count values (CNT1 and CNT2), preferably, a circuit 100 is a redundancy system that provides multiple such determinations. FIG. 1 shows a dual redundancy system.

Thus, a circuit 100 can utilize second separation-detect logic 104-1 to generate separation information in the same general fashion, but in a different clock domain. More particularly, second separation-detect logic 104-1 can receive a second count value CNT2 and a first count value CNT1' as inputs. First count value CNT1' can be the count value CNT1 after being synchronized to clock domain 110-1 by synchronizer 108. Note that synchronizer 108 takes in both CLK1 and CLK2 and synchronizes signals using the opposite clock. Preferably, second separation-detect logic 104-1 can detect a same pre-specified difference as first separation-detect logic 104-0. Second separation information INF_2 generated by second separation-detect logic 104-1 can be synchronized by synchronizer 108 and output as second separation information INF_2'. In the same fashion as the first separation-detect logic 104-1, second separation information INF_2 can be latched and output.

In this way, within each clock domain (110-0 and 110-1), once a faster clock is detected, the results can be latched. For the results that are in the clock domain that does not have the final detector (in this example domain 110-1), the results (INF_2) can be synchronized and passed to the other clock domain (in this example domain 110-2). In a preferred embodiment, when both sides are in agreement of the winner, the detection process is complete.

The above arrangement can provide dual redundancy, as separation information (INF_1) of one clock domain (e.g., 110-0) can be verified by separation information (INF_2) of another clock domain (e.g., 110-1). Such verification should indicate a same or nearly same bit difference between the two clock signals. Startup differences can cause minor variations and the final selection logic 106 should take this into account.

In the particular example of FIG. 1, selection logic 106 can make a final determination as to which clock signal is the fastest. Selection logic 106 can receive separation information representing a difference between a first count and second count. In response to such information, selection logic 106 can indicate the faster of the clock signals. The particular arrangement of FIG. 1 shows a dual-redundancy system, thus selection logic 106 can receive both first separation and second selection information (INF_1 and INF_2'). Once both values indicate a same condition (e.g., CLK1 faster than CLK2 or vice versa), selection logic 106 can select the appropriate clock.

In a preferred embodiment, select logic could be implemented by indicating that the first clock signal condition to be "01" and second clock signal faster condition to be "10", and no decision otherwise. That is, a first clock CLK1 can be determined to be faster once both INF_2'=INF_1=01. A second clock signal CLK2 can be determined to be faster once both INF_2'=INF_1=10. Alternatively, if the measuring domain were CLK2, the conditions to check are INF_2=INF 1'=01 and INF=INF 1'=10. In the event any other logic state exists between the first and second information selection values, the detection process can continue.

Of course, utilization of complementary values to indicate different separation indications is but one approach. Such values do not have to be complements of one another.

Figure 2:
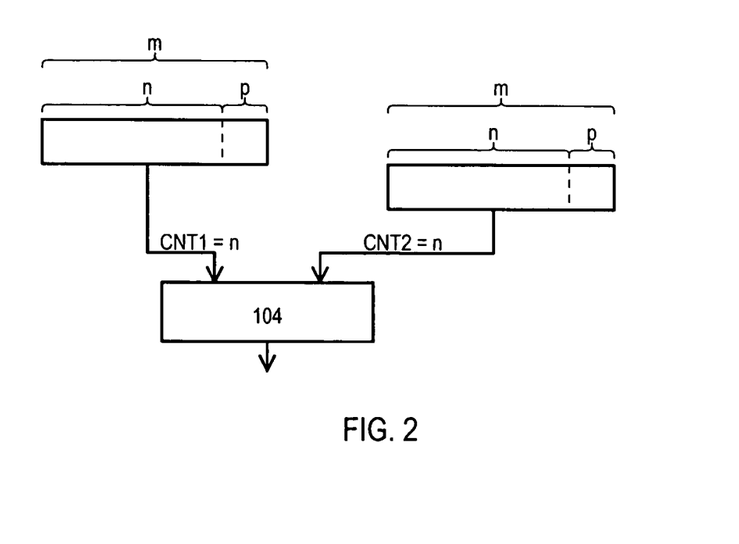
FIG. 2 is a block schematic diagram showing how less significant bits of a count values can be excluded from separation-detect logic.

While comparisons between count values can be made on all bits of such values, optionally, the lower few bits of the counter values can be ignored in making the comparison. FIG. 2 shows one example of an arrangement in which less significant bits are excluded from a detection operation. Received count values can be values of "m" bits, including more significant "n" bits and less significant "p" bits. The more significant bits are supplied to separation-detect logic 104. Separation-detect logic 104 can be either of items 104-0 or 104-1 of FIG. 1, for example.

An arrangement like that shown in FIG. 2 can allow initial start up differences of the clocks and the counters to be ignored. Further, compared bits can be toggled at a lower frequency than a fastest running clock signal.

Figure 3:
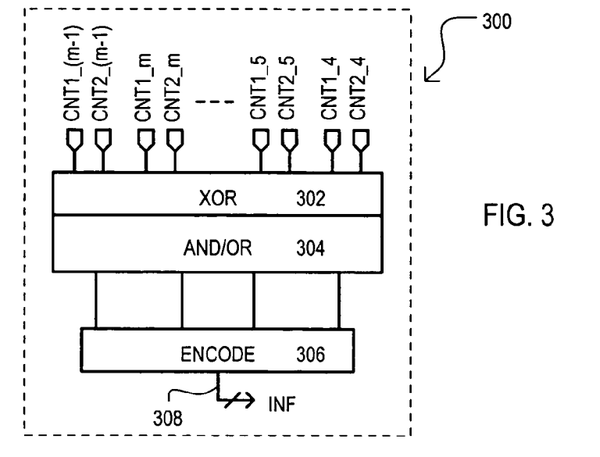
FIG. 3 is a block schematic diagram showing separation-detect logic according to one embodiment.

It is understood that a separation-detect logic may vary depending upon the type of count used (e.g., Gray code versus standard binary code), number of bits ignored (if any), and size of separation detected (bit separation), as but a few examples. One very particular example of separation-detect logic is shown in FIG. 3 and designated by the general reference character 300.

Separation detect logic 300 can include exclusive-OR gate section 302 and AND/OR gate section 304. An XOR gate section 302 can compare each bit of count values generated by both clocks (e.g., counts from both clock domains). Combinatorial AND/OR logic 304 can be used to develop the rest of the separation logic. As but one very particular example, if a 32 bit counters are used (m=32) and the four least significant bits are ignored, an XOR gate section 302 could include the XORing of 28 bits. Further, if 2 bit separation is used for detecting the faster of the clock signals, and AND/OR gate section 304 could include 378 AND gates (i.e., 27+26 . . . +1=378), and less than 10 four input OR gates to generate the desired separation information (INF).

An encoder 306 can encode results from AND/OR gate section 304 into multi-bit separation information INF. As but one example, if count values indicate a first clock is faster, INF can be 01. If count values indicate a second clock is faster, INF can be 10.

Figure 4:
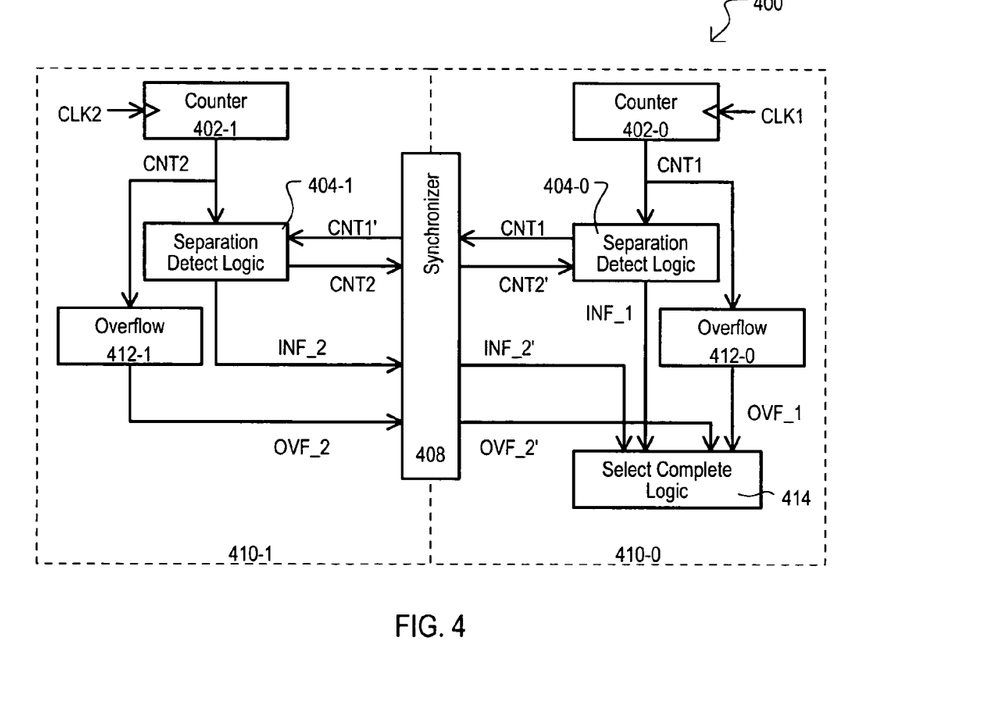
FIG. 4 is a block schematic diagram of an alternate embodiment of the present invention.

While separation-detection can provide a way of rapidly detecting differences in clock speed, it may be desirable to provide multiple clock comparison approaches in order to accommodate a wide range of expected differences in clock signal speeds. FIG. 4 is a block schematic diagram of an alternate embodiment showing such an approach.

FIG. 4 shows a circuit in which the separation of bits approach of the present invention can be used in conjunction with the counter overflow method, described previously.

FIG. 4 includes some of the same general components as FIG. 1. Accordingly, like components will be referred to by the same reference character but with the first digit being a "4" instead of a "1". In addition, a description of such components has been omitted.

The alternate embodiment of FIG. 4 differs from that of FIG. 1 in that it can include overflow detectors 412-0 and 412-1. A first overflow detector 412-0 can receive count value CNT1 generated from first counter 402-0, and can generate an overflow indication OVF_1 once the count overflows (e.g., a most significant bit changes). Overflow detector 412-0 can operate in a first clock domain 410-0.

In the same general fashion, a second overflow detector 412-1 can receive a count value CNT2 and generate an overflow indication OVF_2 in a second clock domain 410-1. An overflow indication OVF_2 can be synchronized to first clock domain 410-0 by synchronizer 408 and provided as overflow indication OVF_2' to selection logic 414.

Alternate embodiment circuit 400 can also differ from that of FIG. 1, in that selection logic 414 can select a clock signal based on both separation information (INF_1 and INF_2'), as well as overflow indications (OVF_1 and OVF_2'). As but one particular example, a first clock CLK1 can be determined to be faster once both INF_2'=INF_1=01 or if OVF1=1. A second clock signal CLK2 can be determined to be faster once both INF_2'=INF_1=10 or if OVF2'=1. As in the case of the first embodiment, in the event any other logic state exists between the first and second information selection values, the detection process can continue.

In this way, multiple detection methods can be included on the same device to accommodate a wide range of frequency differences.

While clock speed detection and selection approaches according to the present invention can be utilized in a variety of applications, such an arrangement may be particularly valuable when utilized in a multi-port memory device, such as a dual-port random access memory (RAM). One such arrangement is shown in FIG. 5.

Figure 5:
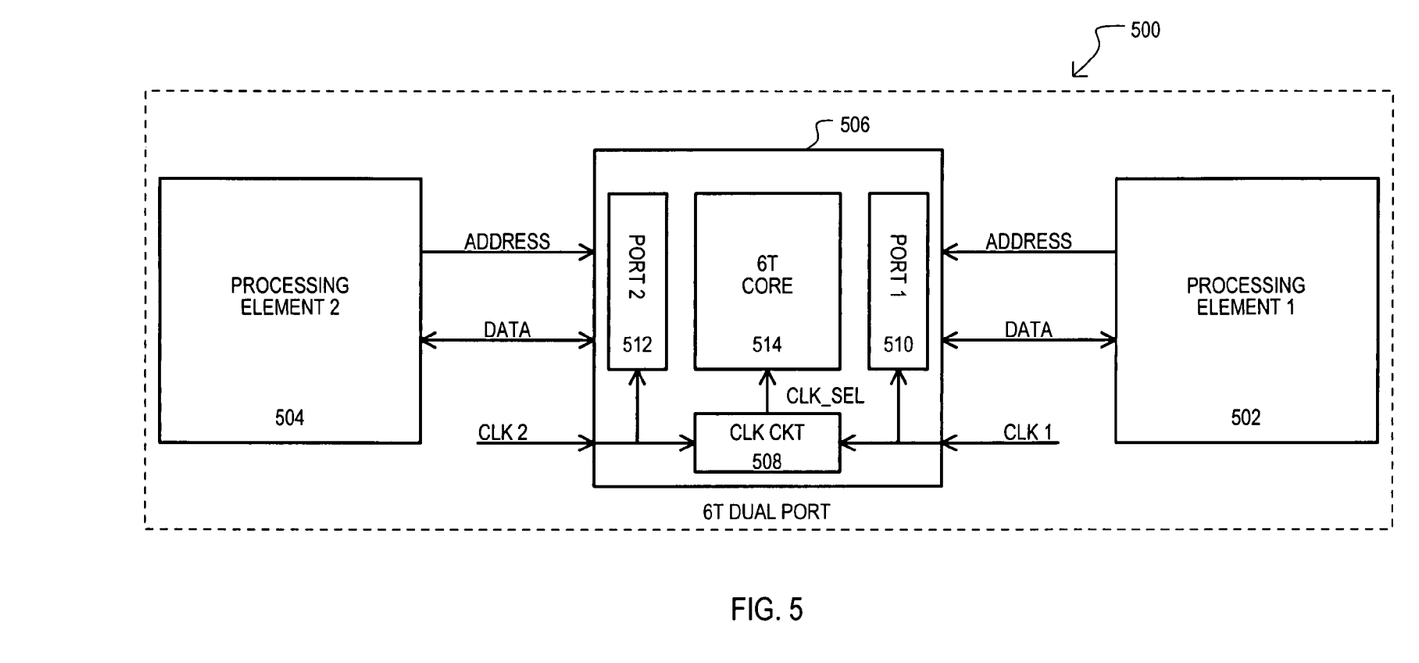
FIG. 5 is a block schematic diagram of another embodiment of the present invention.

FIG. 5 is a block diagram of a system 500 that includes a first processing element 502, second processing element 504, and dual port RAM (DPRAM) 506. A first processing element 502 can operate according to timing established by a first clock signal CLK1. In the particular example shown, address and data values can be applied to access DPRAM 506 via a first port. In the same essential fashion, second processing element 504 can access DPRAM 506 according to timing established by a second clock signal CLK2.

DPRAM 506 can include a clock circuit 508, first input/output (I/O) port 510, second I/O port 512, and core section 514. A clock circuit 508 can the take the form of any of the circuit embodiments described above, or equivalents. Thus, clock circuit 508 can receive a first clock signal CLK1 and second signal CLK2, and determine which is faster by utilizing the separation detection approach, or a combination of separation detection and overflow detection. Based on such a determination, a clock circuit 508 can supply a selected clock CLK_SEL (in this case the faster clock) to core section 514.

A first I/O port 510 can operate with timing established by first clock signal CLK1 (i.e., operate in a first clock domain) and provide a path for address data to core section 514, as well as a bi-directional path for data to/from core section 514. In the same general fashion, a second I/O port 512 can operate in a second domain and provide data paths to/from core section 514.

A core portion 514 can include well known core memory device circuits including but not limited to row and column address decoders, memory cell arrays, and I/O circuits. In the very particular example illustrated, memory cell arrays can be composed of six-transistor (6T) static RAM cells. This configuration creates a dual-port memory by time multiplexing a single port memory so that both ports have access to the memory elements. The preferred embodiment uses a clock derived from the faster of the input clocks.

As understood form FIG. 5, the timing for such circuits can be based on selected clock signal CLK_SEL, which is the faster clock signal selected from between clock signals CLK1 and CLK2.

In this way, the present invention may include a clock circuit that selects a fastest clock signal to provide timing for a core portion of a multi-port RAM.

The approach described in the embodiments above can also be expressed as a series of steps. One particular example is shown in FIG. 6.

Figure 6:
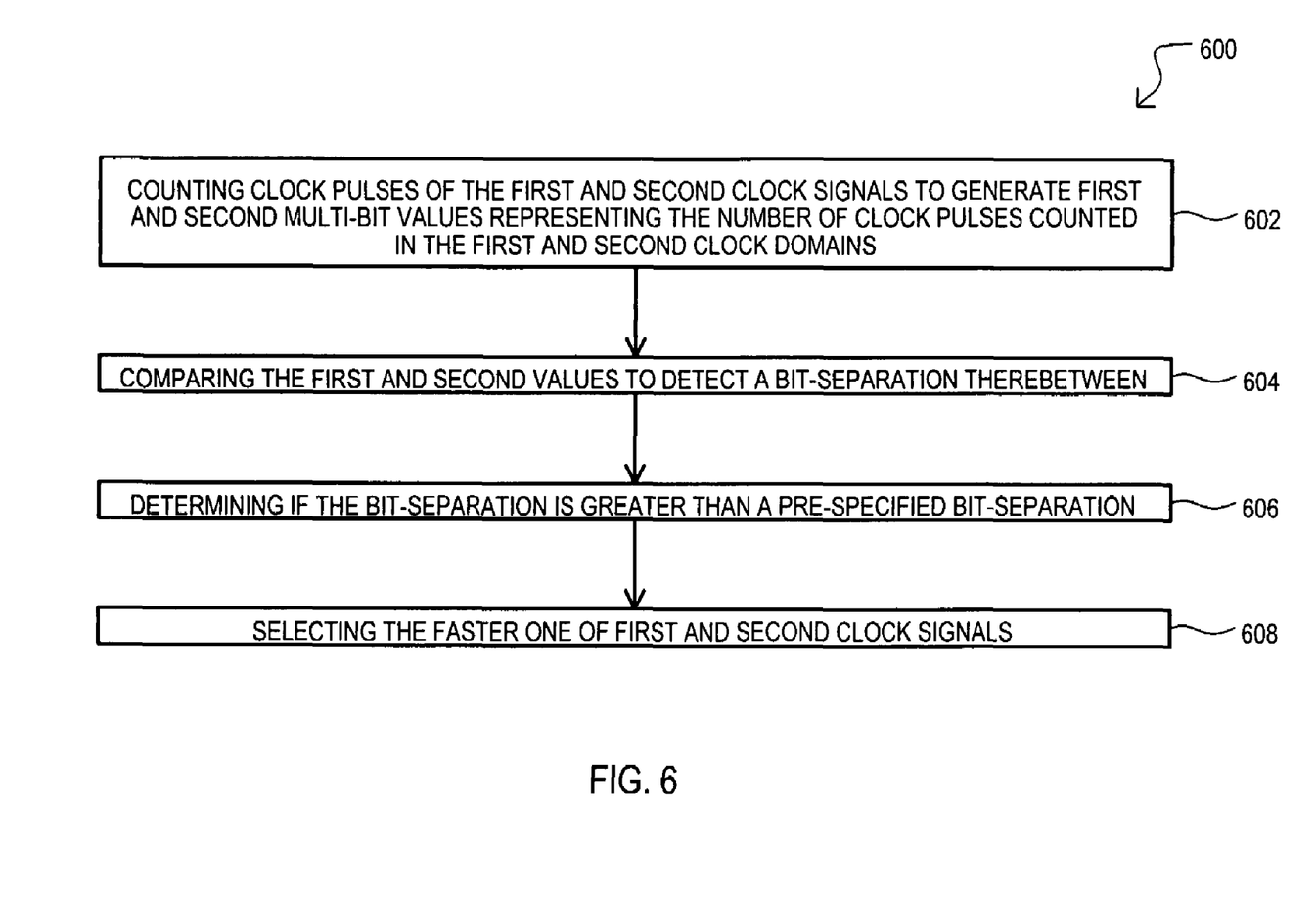
FIG. 6 is a flow diagram according to one embodiment of the present invention.

FIG. 6 is a flow chart showing a method or process for selecting a faster clock from multiple clock signals. Such a method could be used to select a fastest clock for a dual ported memory device receiving multiple clock signals, According to the embodiment of FIG. 6, a method 600 can include counting clock pulses of first and second clock signals. More particularly, this can include generating first and second multi-bit values representing the number of clock pulses counted in first and second clock domains (602).

Count values can be compared to one another to determine how they differ. In the example of FIG. 6, this can include comparing first and second values to detect a bit separation therebetween (604). Once a difference between count values has been determined, the difference can be checked to see if it exceeds a pre-determined limit. In the example of FIG. 6, this can include determining if a bit separation is greater than a pre-specified bit separation (606).

A method 600 can then include selecting a fastest clock signal from among the multiple clock signals. In FIG. 6, this can include selecting the faster one of first and second clock signals (608).

Preferably, as described above, the step of detecting a bit separation between count values can be accomplished with first and second separation-detectors, and the step selecting the faster clock involves receiving bit separation information from the first separation-detector indicating one of the first or second clock signals is faster, and receiving bit separation information from the second separation-detector verifying the indicated clock signal is faster. Such an arrangement is shown in FIG. 7.

Figure 7:
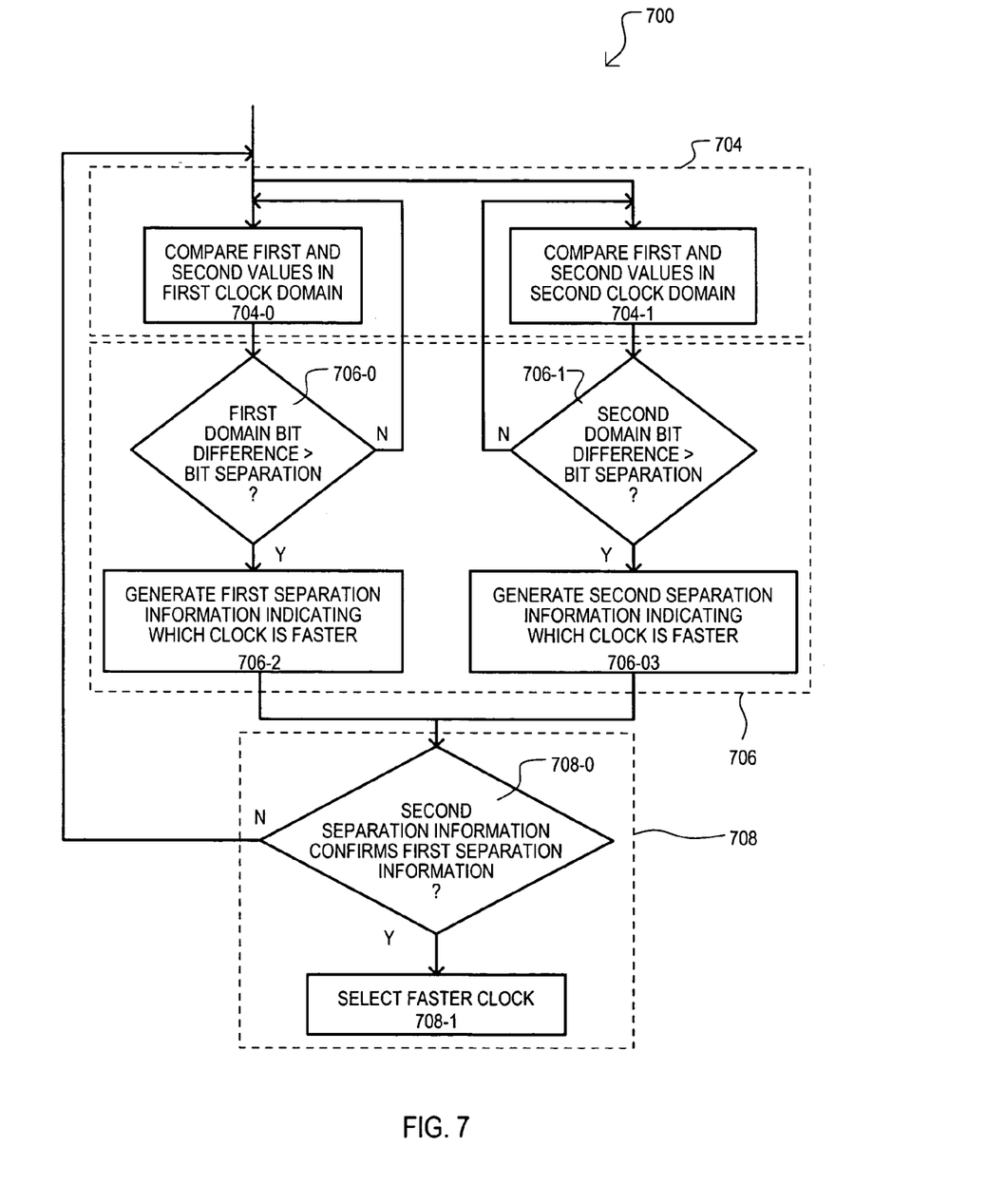
FIG. 7 is a flow diagram showing particular examples of steps in a method according to one embodiment.

FIG. 7 shows a method 700 having general steps 704, 706 and 708, which can correspond to steps 604, 606 and 608 of FIG. 6. Step 704 can include comparing first and second values in a first clock domain 704-0 and in a second clock domain 704-1.

A step 706 can include corresponding bit difference comparison steps 706-0 and 706-1 that can determine if a bit separation meets a pre-specified separation. While the example of FIG. 7 shows a greater-than operation (>), such steps could also include an equal-to (=) or greater-than-or-equal-to ($\geq$) operation. If such a comparison indicates the pre-specified bit separation has not been met, a method 700 can return to comparing first and second values (N branches from steps 706-0 and 706-1).

If a pre-specified bit separation has been met (Y branches from steps 706-0 and 706-1), a step 706 can generate separation information indicating which clock is faster from the previous comparisons (706-2 and 706-3). As noted previously, such values can preferably be multi-bit values, with one combination indicating one clock is faster, and the corresponding complement of the one combination indicating the other clock is faster.

A step 708 can include determining if second separation information confirms first separation information 708-0. Note that the comparison of the two values can occur only after each has determined the faster clock. If one arrives at a determination of the faster clock prior to the other, the decision can be delayed until both are ready. If the two values do not coincide, a method can return to comparing the first and second value (N branch from 708-0). If the values confirm one another, the faster of the two clocks can be selected 708-1.

As also noted above, optionally, a pair of overflow detectors can be included and the present invention can incorporate both bit separation detection and overflow detection. One example of such an arrangement is shown in FIG. 8 and designated by the general reference character 800.

Figure 8:
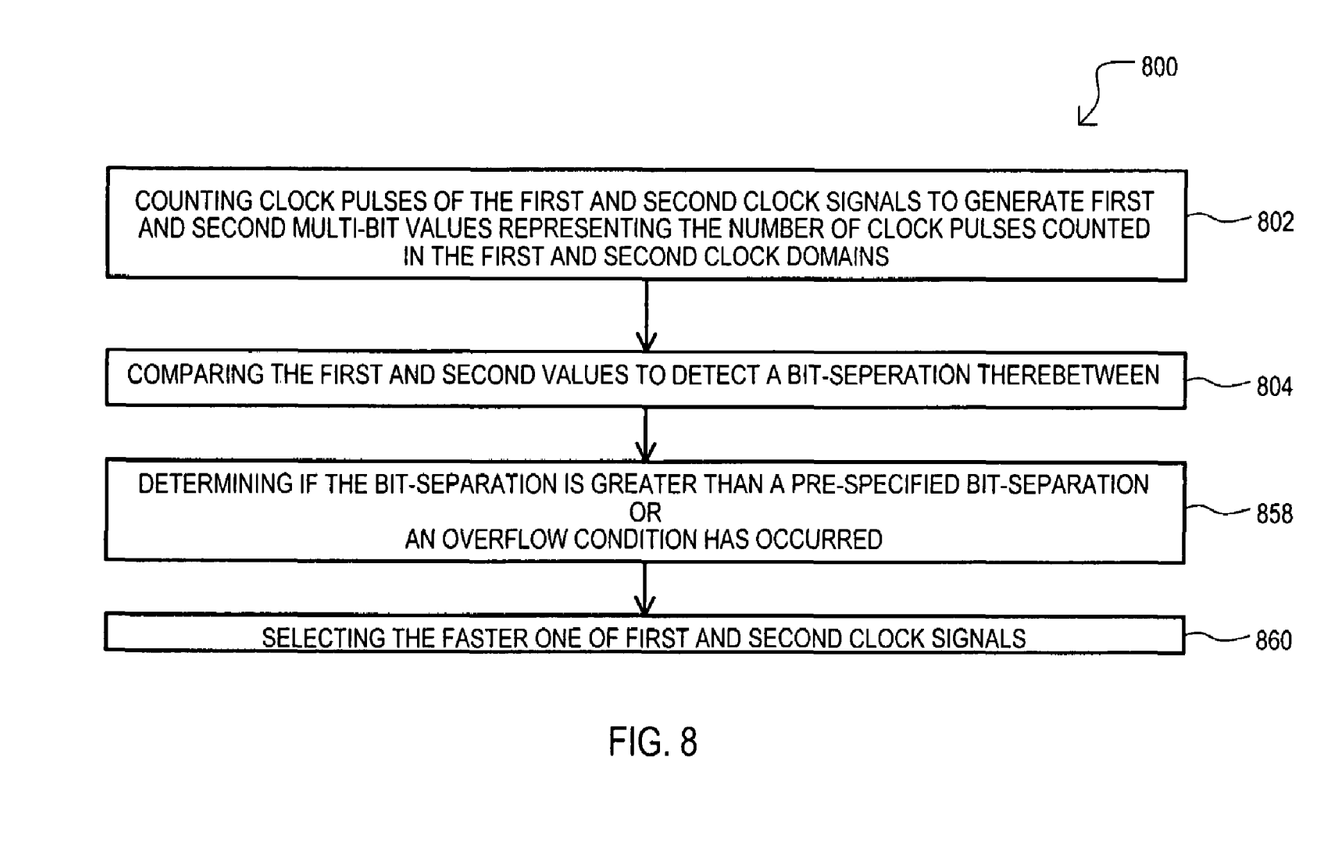
FIG. 8 is a flow diagram showing a method according to an alternate embodiment.

FIG. 8 includes some of the same general steps as FIG. 6. Accordingly, like steps will be referred to by the same reference character but with the first digit being an "8" instead of a "6". In addition, a description of such steps will be omitted.

FIG. 8 differs from FIG. 6 in that a step 858 can include determining if an overflow condition has been met in addition to determining if the pre-determined bit separation has been met.

Finally, a step 860 can vary from that of FIG. 6 by selecting a faster clock based on either the pre-determined bit separation or an overflow condition.

It will be appreciated that faster clock detection using bit separation according to the present invention provides quicker detection of the faster clock than a conventional counter overflow method, such as that noted above. Such advantages may be best understood by example.

According to one example of a circuit and method of the present invention, if the least significant 4 bits are ignored and the pre-specified bit separation is designed to be 2 bits, according to the embodiments above, it would take only 32 fast cycles to detect the fast clock. Similarly, if 3-bit separation is required, it would take 80 fast clock cycles to complete. It is understood that this example assumes substantially different clock rates.

Details of and values for the above examples are shown below.

2 Bit Separation Example
Counter Value (2X)=32 (dec)=0100000 (bin)
Ignoring least significant 4 bits=>010
Counter Value (1X)=16 (dec)=0010000 (bin)
Ignoring least significant 4 bits=>001
Comparing the two counter values shows a distance of two bits.

3 Bit Separation Example
Counter Value (2X)=80 (dec)=1010000 (bin)
Ignoring least significant 4 bits=>101
Counter Value (1X)=40 (dec)=0101000 (bin)
Ignoring least significant 4 bits=>010.
Comparing the two counter values show a distance of three bits.

As noted above, the disclosed embodiments have shown approaches in which dual winner detection logic is employed. Such arrangements can advantageously ensure that a false winner is not detected. That is, such logic can ensure that after a winner on one side (i.e., one clock domain) has been determined, such a determination can be confirmed on the other side (i.e., other clock domain). This will ensure no false winner is detected.

It is noted that the conventional approaches, like that of FIG. 9, provide no such redundancy in selection determination.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching.

For example, it will be understood that although described as determining the faster clock from a pair of clocks, the apparatus and method of the present invention could be modified and used to detect the faster clock from among more than two received clock signals without departing from the scope and spirit of the invention. Similarly, a slower of two clocks can be detected.

It is also understood that the embodiments of the invention may be practiced in the absence of an element and or step not specifically disclosed. That is, an inventive feature of the invention can be elimination of an element.

It is intended that the scope of the invention encompass the generic area as herein disclosed, and by the claims appended hereto and their equivalents.

What is claimed is:

1. An apparatus for detecting and selecting a faster clock signal from a plurality of clock signals, comprising:
   at least two counters, each adapted to receive and count pulses of one of the clock signals;
   a pair of separation-detectors each coupled to one of the at least two counters and to one another, each separation-detector receiving a multi-bit count value representing a clock pulse count for the corresponding counter, comparing the received multi-bit count value to a multi-bit count value from another counter, and detecting a pre-specified bit separation between said multi-bit count values; and
   a selector that receives bit separation information from the pair of separation-detectors adapted to select the faster of the clock signals.

2. The apparatus of claim 1, wherein:
   the at least two counters are Gray code counters.

3. The apparatus of claim 1, further including:
   a synchronizer through which each of the separation-detectors are coupled to each other, and through which at least one separation-detector is coupled to the selector, the synchronizer adapted to synchronize the output from one of the counters to at least one of the separation detectors.

4. The apparatus of claim 1, wherein:
   each separation-detector ignores a number of least significant bits of the multi-bit counts when comparing the received multi-bit count value to the multi-bit count value from the other counter.

5. The apparatus of claim 1, further including:
   at least two overflow-detectors coupled to the at least two counters and to one another, each overflow-detector receiving the multi-bit count value representing a clock pulse count for the corresponding counter and generating an overflow indication when the received multi-bit count value overflows; and
   the selector is coupled to receive the overflow indication from each of the overflow-detectors.

6. The apparatus of claim 1, wherein:
   each separation-detector generates bit separation information upon detecting the pre-specified bit separation between a first count value and a second count value, the bit separation information from at least one of the bit separation detectors having a first value when the first count value exceeds the second count value, and a second value when the second count value exceeds the first count value.

7. The apparatus of claim 6, further including:
   the second value is the complement of the first value.

8. The apparatus of claim 1, further including:
   the apparatus being formed within a dual port memory device having an internal memory core that runs on timing based on the faster clock signal as selected by the selector.

9. A method for detecting and selecting a faster one of first and second clock signals having different frequencies, comprising the steps of:
   counting clock pulses of the first and second clock signals to generate a multi-bit first value representing a number of clock pulses of the first clock signal and a multi-bit second value representing a number of clock pulses of the second clock signal;
   detecting a bit-separation between the multi-bit first and second values and determining if the bit-separation is greater than a pre-specified bit-separation, including comparing the multi-bit first and second values in a first separation-detector and determining if a bit separation between the two values is greater than a pre-specified bit separation, and comparing the multi-bit first and second values in a second separation-detector and determining if a bit separation between the two values is greater than the pre-specified bit separation; and
   selecting the faster one of first and second clock signals.

10. The method of claim 9, wherein:
    the step of counting clock pulses comprises
      counting the first clock signal pulses according to a Gray code count, and
      counting the second clock signal pulses according to a Gray code count.

11. The method of claim 9, wherein:

the step of selecting the faster one of first and second clock signals includes receiving first bit separation information from the first separation-detector that indicates one of the first or second clock signals is faster,     receiving second bit separation information from the second separation-detector that indicates one of the first or second clock signals is faster, and     selecting the faster clock signal when first bit separation information is verified by the second bit separation information.

12. A semiconductor device, comprising:

a first counter that generates a first count value based on pulses of a first clock signal;

first detect logic that compares the first count value to a second count value and generates first selection information representing a frequency difference between the first clock signal and a second clock signal;

a synchronizer circuit that provides the second count value to the first detect logic, the second count value being based on pulses of the second clock signal; and selection logic for selecting the first clock signal or second clock signal as a timing signal for an internal section of the semiconductor device based on at least the first selection information.

13. The semiconductor device of claim 12, wherein:

the first selection information is a multi-bit value.

14. The semiconductor device of claim 12, further including:

the first count value is a multi-bit value;

the second count value has a bit corresponding to each bit of the first count value; and     the first detect logic comprises a plurality of exclusive-OR (XOR) gates, each having one input coupled to receive a bit of the first count value and another input coupled to receive the corresponding bit of the second count value.

15. The semiconductor device of claim 12, wherein:

the first counter operation is based on a timing of the first clock signal; and a second counter that generates the second count value based on pulses of the second clock, the second counter operation being based on a timing of the second clock signal.

16. The semiconductor device of claim 12, further including:

second detect logic that compares the first count value to a second count value and generates second selection information representing a frequency difference between the first clock signal and a second clock signal.

17. The semiconductor device of claim 12, further including:

second detect logic that compares the first count value to a second count value and generates second selection information representing a frequency difference between the first clock signal and a second clock signal; and     the selection logic selects the first clock signal or second clock signal as the timing signal based on at least the first and second selection information.

18. The semiconductor device of claim 12, further including:

at least a first overflow detector coupled to the first counter that generates a first overflow indication when the first counter overflows; and     selection logic for selecting the first clock signal or second clock signal as a timing signal for an internal section of the semiconductor device based on at least the first selection information and the first overflow indication.

19. The semiconductor device of claim 18, further including:

a second counter that generates the second count value based on pulses of the second clock, the second counter operation being based on a timing of the second clock signal;

a second overflow detector coupled to the second counter that generates a second overflow indication when the second counter overflows;

second detect logic that compares the first count value to a second count value and generates second selection information representing a frequency difference between the first clock signal and a second clock signal; and     the selection logic selects the first clock signal or second clock signal based on at least the first and second selection information and the first and second overflow indications.

\* \* \* \* \*